(12) United States Patent
Kato et al.

(10) Patent No.: US 6,208,105 B1
(45) Date of Patent: Mar. 27, 2001

(54) ROBOT CONTROLLER

(75) Inventors: Tetsuaki Kato, Hadano; Toru Shirahata, Oshino-mura, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/194,440

(22) PCT Filed: Mar. 25, 1998

(86) PCT No.: PCT/JP98/01326

§ 371 Date: Nov. 25, 1998

§ 102(e) Date: Nov. 25, 1998

(87) PCT Pub. No.: WO98/42483

PCT Pub. Date: Oct. 1, 1998

(30) Foreign Application Priority Data

Mar. 25, 1997 (JP) .................................... 9-088659

(51) Int. Cl.[7] .................................................. B25J 19/00
(52) U.S. Cl. ............... 318/568.24; 318/567; 318/568.16; 901/2; 901/9
(58) Field of Search .................... 318/560, 561, 318/567–569, 600, 601; 901/2, 9, 19, 20, 23, 46

(56) References Cited

U.S. PATENT DOCUMENTS

| | | | |
|---|---|---|---|
| 4,475,160 | * 10/1984 | Inaba | 318/568.16 |
| 4,904,911 | * 2/1990 | Toyoda et al. | 318/568.24 |
| 4,973,895 | 11/1990 | Torii et al. | |
| 5,221,884 | * 6/1993 | Teshima | 318/569 |
| 5,834,916 | * 11/1998 | Shimogama et al. | 318/568.13 |

FOREIGN PATENT DOCUMENTS

| | | |
|---|---|---|
| 63-260786 | 10/1988 | (JP) . |
| 1-116704 | 5/1989 | (JP) . |
| 1-301093 | 5/1989 | (JP) . |
| 4-189488 | 7/1992 | (JP) . |
| 4-340106 | 11/1992 | (JP) . |
| 6-91587 | 4/1994 | (JP) . |
| 6-335881 | 12/1994 | (JP) . |
| 7-223183 | 8/1995 | (JP) . |
| 8-194512 | 7/1996 | (JP) . |

* cited by examiner

Primary Examiner—David Martin
(74) Attorney, Agent, or Firm—Staas & Halsey LLP

(57) ABSTRACT

A robot controller determines an abnormality in position, velocity or acceleration of an end effector or a rotational axis of a robot. The robot controller includes a servo CPU that periodically writes current position data in a shared RAM with a host CPU. The current position data is obtained from robot position sensors. Using the written position data, the host CPU periodically compares stored data corresponding to position, velocity or acceleration with the newly written data. When an abnormal motion is detected, the robot is immediately stopped.

10 Claims, 7 Drawing Sheets

F I G. 6
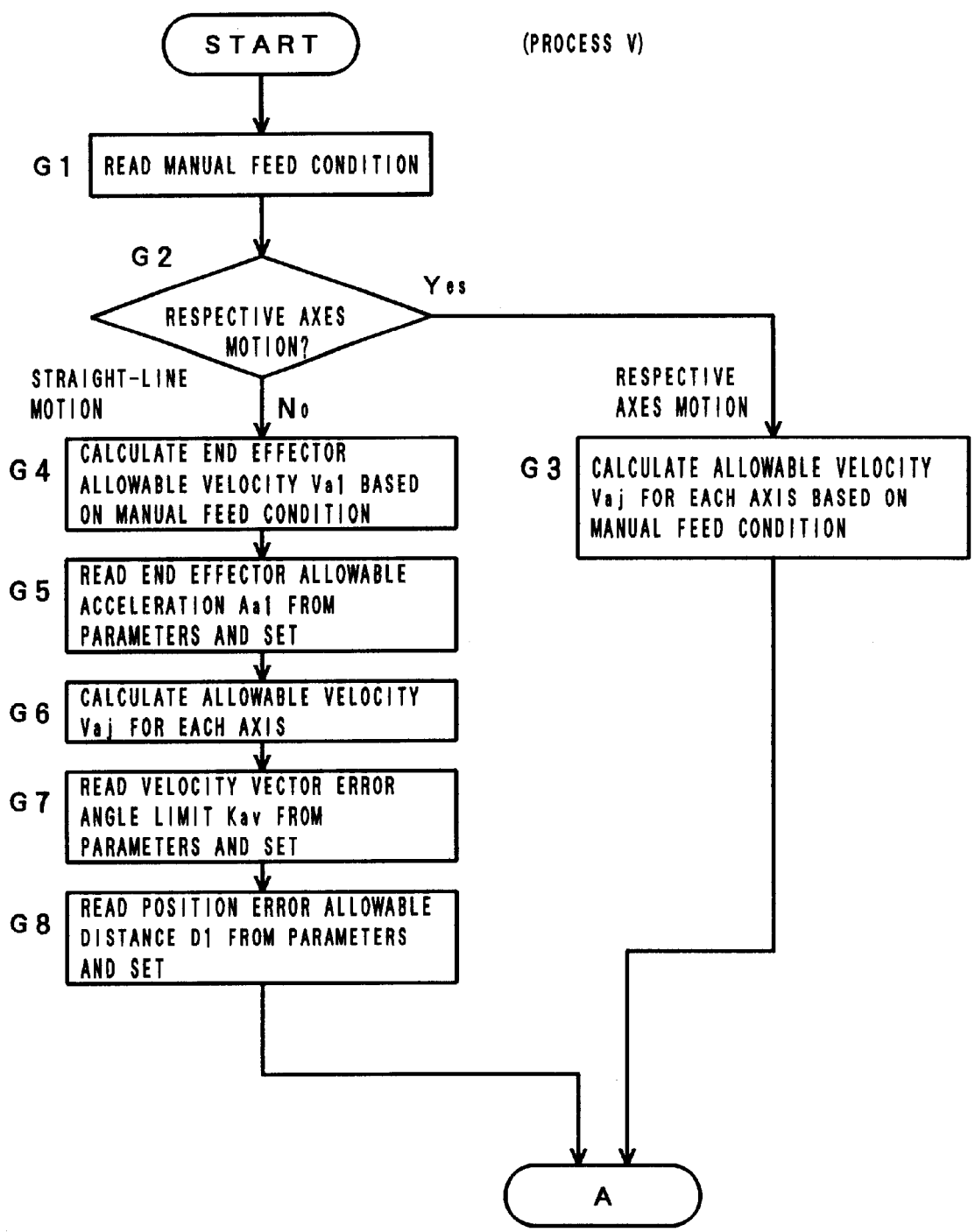

$\|Ha\| = \|Hv\| = 1$

ROBOT CONTROLLER

TECHNICAL FIELD

The present invention relates to a robot controller for controlling an industrial robot, and more particularly to a robot controller having an erroneous motion detecting function.

BACKGROUND ART

Robots used in factories and the like sometimes make an abnormal motion due to a failure in a hardware component or a software defect; for example, a robot sometimes makes a motion at a velocity exceeding a value specified by a program or manually specified by a user, or moves toward an unexpected position.

Emergency stop buttons are provided on robots, but since servomotors of high power are mounted on recent robots, it is difficult to immediately stop a robot which has started an abnormal motion by merely depressing the emergency stop button. In addition, an operator tends to be late in depressing the emergency stop button.

In view of the above, there has been proposed a method in which a motion amount of each axis of a robot is periodically monitored by a robot controller and when the motion amount exceeds a predetermined limit value, the robot is automatically stopped, independently of the emergency stop button. This method, however, includes the following problems.

In performing a path control for straight-line or circular-arc, it is natural that velocities of axes greatly differ from one another, and particularly in a control for a path passing near a singular point, the maximum velocity is often required for a wrist axis etc. to maintain a designated orientation of the robot. Therefore, it is not appropriate to set a lower limit value for the detection of abnormal motions so as to avoid erroneous detection of abnormal motions. Consequently, even when an unexpected motion actually occurs, such a motion sometimes can not be determined to be abnormal and the robot is unable to be stopped automatically.

Further, with the above method, in the case where an abnormality occurs as to a position of a robot in motion, for example, a substantial deviation of the robot position from a taught path or a manual feed (Jog feed) direction occurs, such abnormality can not be detected to automatically stop the robot, as long as the velocities of motion of the respective axes are not abnormal.

Thus, the conventional technique is not sufficiently capable of immediately and surely responding to robot motions (abnormal state of motion or abnormal position in motion), posing problems in securing safety of the operator and protection of peripheral equipment.

SUMMARY OF INVENTION

An object of the present invention is to provide a robot controller capable of immediately and automatically sensing an abnormality and stopping a robot to avoid danger when a point representing a robot position is taking an abnormal velocity, an abnormal acceleration or an abnormal motion path in space when the robot operates in a program playback operation mode or in a manual operation mode such as a jog feed.

A robot controller according to the present invention comprises: abnormal motion detection index creating means for periodically creating an abnormal motion detection index for detecting an abnormal motion in space of a point representing a position of a robot, based on present position data of respective robot axes obtained from outputs of position detectors of the robot axes while the robot is in motion; determination means for comparing the abnormal motion detection index with a predetermined reference abnormal motion detection reference, and determining that an abnormal motion has occurred when the abnormal motion detection index exceeds the predetermined abnormal motion detection reference; and stopping means for immediately stopping motion of the robot when an abnormal motion of the robot is detected by the determination means.

Abnormal motion which can be detected with the robot controller according to the present invention is abnormal motion of the robot position-representative point during a program playback or manual feed (jog feed) operation, and the abnormal motions are classified into motion abnormality types stated below. Abnormalities 1 to 4 can be collectively referred to as "abnormality of motion" and abnormality 5 as "abnormality of position". The term "robot position-representative point" used hin this specification denotes a point set in a fixed relation with respect to end effectors such as a robot hand, a welding torch or the like.

Typically, the robot position-representative point is the origin (tool center point) of a tool coordinate system set with respect to an end effector to be mounted, or the origin of a faceplate coordinate system set with respect to a tool mounting face. In the following description, the robot position-representative point is set at the tool center point (TCP) for convenience sake, but may be set at some other point. (Abnormality 1) Abnormality in Moving Velocity of Tool Center Point: The tool center point moves at a velocity exceeding a limit velocity. (Abnormality 2) Abnormality in Acceleration of Tool Center Point: The tool center point moves at an acceleration exceeding a limit acceleration. (Abnormality 3) Abnormality in Angular Velocity of Wrist Axis: The wrist axis moves at an angular velocity exceeding a limit angular velocity. For example, a state in which the final axis of a 6-axis robot rotates at an abnormally high velocity. (Abnormality 4) Abnormality in Direction of Movement of Tool Center Point: During path control, the tool center point moves beyond a limit in a direction away from the direction of a trajectory calculated from position data in the program. (Abnormality 5) Abnormality in moved Position of Tool Center Point: During path control, the tool center point moves beyond a limit to a position apart from a trajectory calculated from position data in the program.

In a preferred embodiment of the present invention, all of these motion abnormalities can be detected, but some of the abnormalities alone may be detected according to circumstances. For example, only abnormalities 1 and 5 may be detected, and even in this case many of abnormal robot motions can be detected.

The abnormal motion detection index is created within the control device so as to match abnormal motion to be detected and is compared with a corresponding abnormal motion detection criterion, and if an abnormal motion is detected, a process for stopping the robot is executed. Preferably, the abnormal motion detection criterion is automatically created within the control device in accordance with data in a taught motion program or manual feed conditions.

BRIEF DESCRIPTION OF THE DRAWINGS

FIG. 6 is a flowchart showing an outline of a process V to be executed within the robot controller according to the embodiment of the present invention;

BEST MODE FOR CARRYING OUT THE INVENTION

Figure 1:
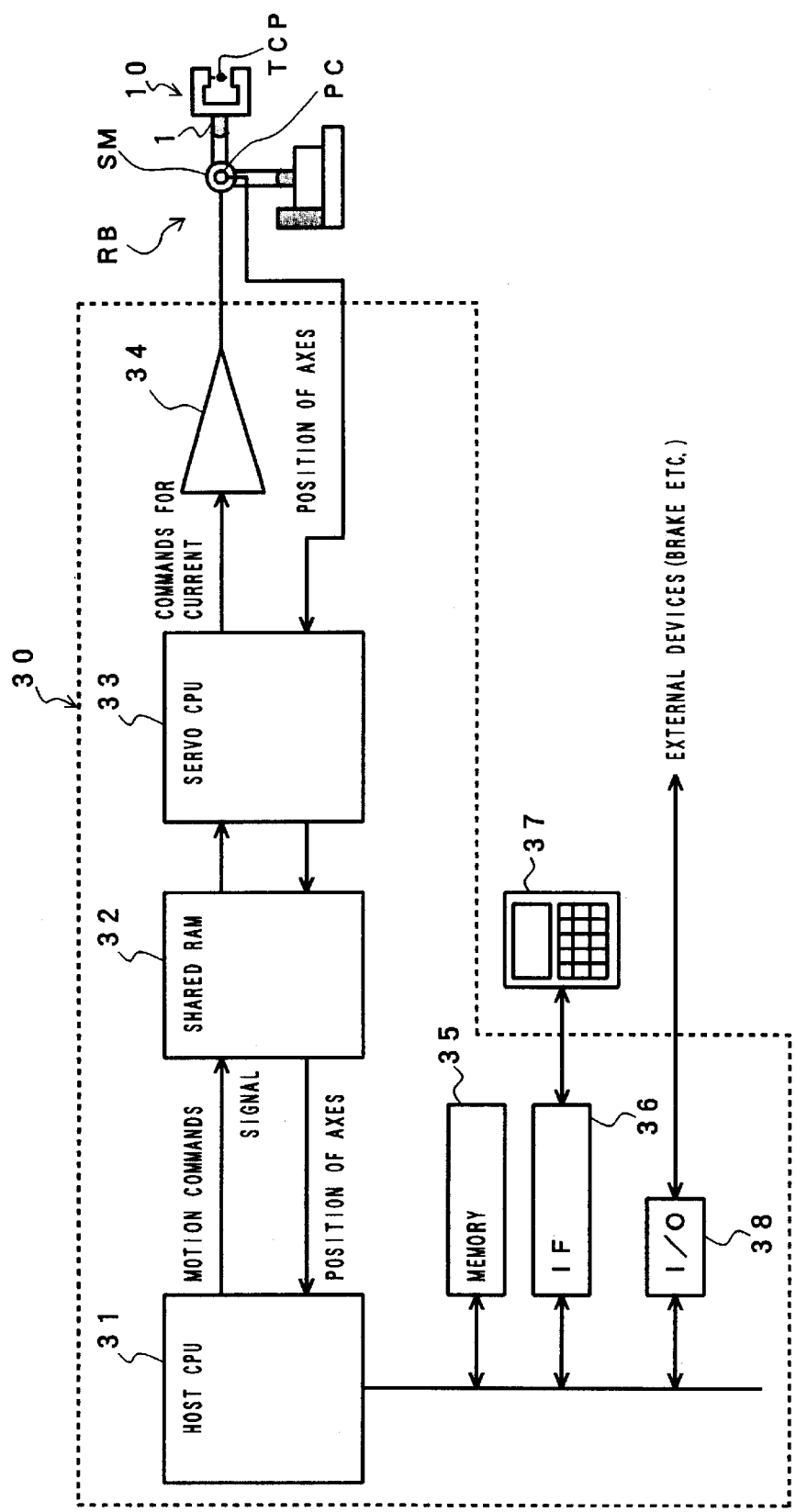
FIG. 1 is a block diagram showing, by way of example, the configuration of principal parts of a robot system including a robot controller to which the present invention is applied.

FIG. 1 is a block diagram exemplifying the hardware configuration of principal parts of a robot system including a robot controller to which the present invention is applied. As shown in FIG. 1, a robot controller 30 controls a robot RB having a hard 10 as an end effector mounted to a distal end portion 1 of its arm. A tool center point TCP, which is a point representative of the position of the end effector (hand 10), is set at the center of the hand 10.

The robot controller 30 comprises a host CPU 31, a shared RAM 32, a servo CPU 33, servo amplifiers 34, a memory 35, an interface 36 for a teaching panel, and input/output devices 38 for general external devices. The memory 35 includes a ROM storing system programs, a RAM for temporarily storing data, and a nonvolatile memory storing various program data defining system operations (motions of the robot RB).

A teaching panel 37, which is connected to the teaching panel interface 36, is used for inputting, modifying and registering program data, and for manually inputting a manual feed (jog feed) command, a playback operation command, etc. To the input/output devices 38 for external devices are connected a mechanical brake for the robot RB, as well as various external devices (e.g., a welding power supply unit) matching intended applications.

During execution of playback operation or manual feed (jog feed) operation, the host CPU 31 creates motion commands for servomotors SM associated with the respective axes of the robot RB and outputs the commands to the shared RAM 32. The servo CPU 33 reads out the commands at short intervals of time, and, based on position signals (feedback signals) supplied from position detectors (pulse coder PCs) of the respective axes of the robot, executes servo processing and outputs current commands to the servo amplifiers 34 of the respective axes, to drive the servomotors of the respective robot axes. Further, based on the position signals (feedback signals) supplied from the pulse coder PCs of the respective robot axes, the servo CPU 33 periodically writes current positions of the respective robot axes in the shared RAM 32. The servo amplifier 34, the servomotor SM and the pulse coder PC shown in FIG. 1 are those associated with one robot axis only, and those associated with the other axes are omitted from the figure.

The configuration and functions described above are not particularly different from those of an ordinary robot system. This embodiment differs from conventional systems in that the memory 35 stores therein program data defining a process for sensing an abnormal motion of the robot and stopping the robot, and related set values.

FIGS. 2 through 6 are flowcharts summarizing processings executed by the robot controller 30 to which the present invention is applied. In the following, the individual processes will be described with reference to FIGS. 2 through 6 as well as to FIGS. 7 and 8 relating thereto.

Figure 2:
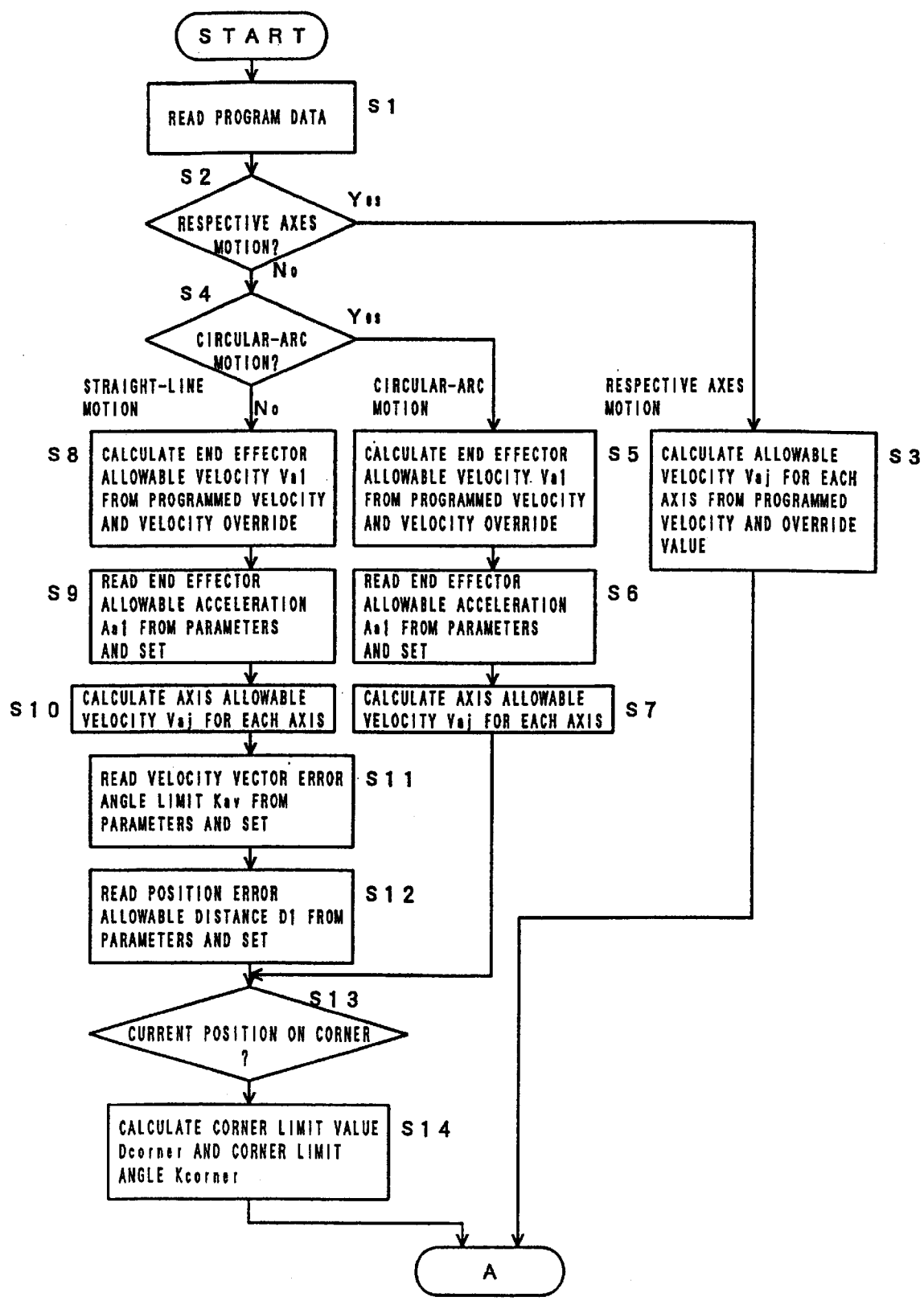
FIG. 2 is a flowchart showing an outline of a processing I to be executed within a robot controller according to an embodiment of the present invention.

Process I (FIG. 2)

This process is a process for internally creating criteria for abnormal motion detection in accordance with data in a taught motion program and specified override conditions, and the contents of the individual steps of the process are explained below. The process I of this embodiment is executed each time a motion instruction statement in the motion program is read out following a playback operation start command. However, when a motion program is specified, criteria for abnormal motion detection matching such specified motion program may be created beforehand aside from the playback operation start command.

(S1): One block of data is read out from the motion program.

(S2): If the type of motion specified is a respective axes motion, the flow proceeds to Step S3; if not, the flow proceeds to Step S4.

(S3): In accordance with the velocity specified in the motion program and a set override value, an allowable velocity Vaj for each axis jth axis) is calculated and set. The allowable velocity Vaj may be set in common for some or all of the axes. Provided the programmed velocity is Vpr and the override value is α, for example, the allowable velocity Vaj is obtained by multiplying Vbj by a coefficient k1, greater than "1" (e.g., "1.2"), Vbj being a maximum value of axis velocity calculated based on α Vpr.

(S4): If the specified motion type is circular-arc motion, the flow proceeds to Step S 5; if not, the flow proceeds to Step S8.

(S5): In accordance with the velocity specified in the motion program and a set override value, an allowable velocity Val for the end effector is calculated and set. For example, provided the programmed velocity is Vpr and the override value is α, the allowable velocity Val is obtained by multiplying Vcl by a coefficient k2, greater than "1" (e.g., "1.2"), Vcl being a maximum velocity of the end effector calculated based on α Vpr. (S6): An allowable acceleration Aal for the end effector is read out from preset parameters and is set.

(S7): An allowable velocity Vaj for each axis jth axis) is calculated and set. The allowable velocity Vaj is calculated based on current position data of each axis (read out from the shared RAM 32) and Jacobian data. As is well known in the art, Jacobian data is essential to the calculation of inverse transform for creating motion commands for the respective axes of the robot and is taught in advance to the robot controller.

(S8): In accordance with the velocity specified in the motion program and a set override value, an allowable velocity Val for the end effector is calculated and set. For example, provided the programmed velocity is Vpr and the override value is α, the allowable velocity Val is obtained by multiplying Vdl by a coefficient k3, greater than "1" (e.g., "1.2"), Vdl being an end effector velocity value calculated based on α Vpr.

(S9): An allowable acceleration Aal for the end effector is read out from preset parameters and is set.

(S10): An allowable velocity Vaj for each axis jth axis) is calculated and set. The allowable velocity Vaj is calculated based on current position data of each axis (read out from the shared RAM 32) and Jacobian data, as in Step S 7.

(S11): A velocity vector error angle limit value Kav for the end effector is read out from preset parameters and is set.

(S12): An allowable distance limit value D1 for the end effector is read out from preset parameters and is set. The allowable distance limit value D1 is a limit value for the amount of deviation of the position of the end effector (position of the tool center point) from a taught path.

(S13): Comparison is made between a taught path of a current cycle and a taught path of an immediately preceding cycle to determine whether or not the current position is on a corner. If the angle of intersection of the two taught paths is greater than a preset threshold angle (e.g., 30°), for example, it is determined that the current position is on a corner. Alternatively, since two or more motions overlap at a corner, overlapping of two or more motions may be detected on a software basis to determine a corner. Only when it is determined that the current position is on a corner, Step S14 is executed.

(S14): An allowable distance limit value Dcorner and a velocity vector error angle limit value Kcorner for the corner are set. In general, Dcorner is set as an increment to D1, and Kcorner is set as an increment to Kav.

The values of Dcorner and Kcorner may either be variable dependent on conditions such as velocity, corner angle, etc., or be fixed in order to reduce the volume of calculation.

In the process I described above, criteria for detecting various abnormal motions of the robot are set in accordance with the type of motion specified in a taught interval concerned. The state in which such settings have been completed is referred to as state A. It should be noted here that the process I is executed while the robot is in motion (in the vicinity of the end of a preceding taught path), except at the start of the robot. Taking this into account, processes II to IV for detecting abnormality in motion will be described.

Figure 3:
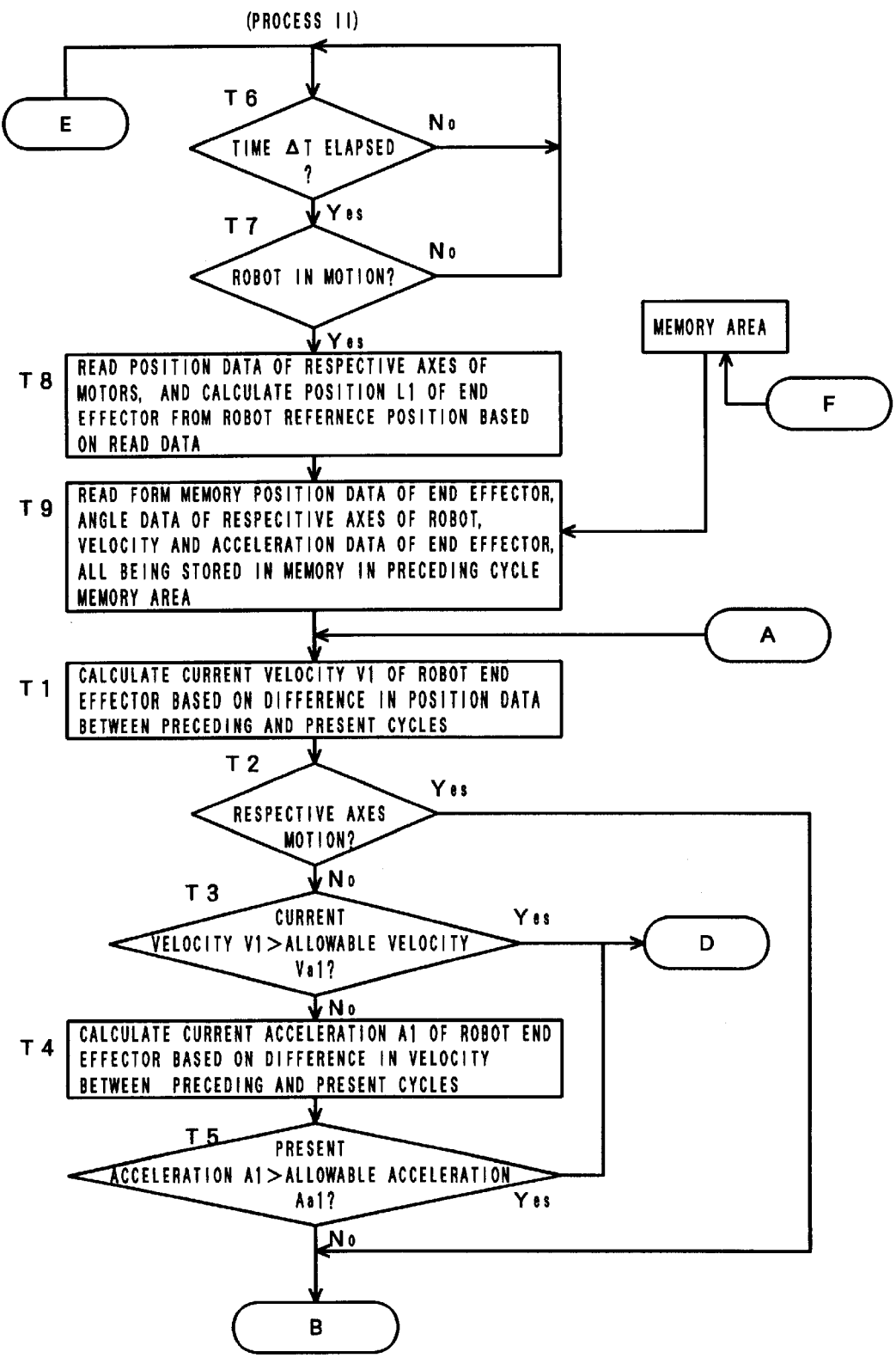
FIG. 3 is a flowchart showing an outline of a process II to be executed within the robot controller according to the embodiment of the present invention.

Process II (FIG. 3)

This process is part of a process for detecting an abnormal motion by using the abnormal motion detection criteria created in the process I. The steps in the flowchart are numbered in consideration of process sequence at the start of the robot and the contents thereof are explained in consistency with the process sequence.

(T1): Based on the difference between position data read out from the shared RAM 32 in the preceding cycle and position data read out from the shared RAM 32 in the current cycle, a current moving velocity V1 of the end effector is calculated.

(T2): If the specified type of motion is the respective axes motion, the flow proceeds to a processing cycle (described later) labeled B; if not, the flow proceeds to Step T3.

(T3): With regard to the end effector, its current velocity VI is compared with the allowable velocity (limit value) Val set in the process I. If the former is greater than the latter, the flow proceeds to a process (robot stopping process as described later) labeled D; if not, the flow proceeds to Step T4.

(T4): Based on the difference between a moving velocity of the end effector calculated in the preceding cycle and that calculated in the current cycle, a current acceleration A1 of the end effector is calculated.

(T5): With respect to the end effector, its current acceleration A1 is compared with the allowable acceleration (limit value) Aa1 set in the process I. If the former is greater than the latter, the flow proceeds to the process (robot stopping process, described later) labeled D; if not, the flow proceeds to the processing cycle (described later) labeled B.

(T6): In this step, which starts following the entry to a state labeled E (described later), a lapse of a time period ΔT equivalent to an ITP (calculation period), is measured, and then the flow proceeds to Step T7.

(T7): If the robot is in motion, the flow proceeds to Step T8. If the robot is not in motion, the flow returns to Step T6 to wait for another calculation period.

(T8): Position data of the respective axes of the motors are read from the shared RAM 32, and based on the read data, the position (including orientation) L1 of the end effector is calculated from a robot reference position. The robot reference position is, for example, the origin of a base coordinate system set with respect to the robot. L1 can be obtained through calculations of forward transformations with respect to the respective axis positions and based on the set data of a tool coordinate system.

(T9): Position data of the end effector, angle data of the respective axes of the robot and the acceleration data of the end effector, all stored in memory in the preceding cycle, are read out from the memory, and the flow proceeds to Step T1. Step T1 and the subsequent steps, which follow Step T9, are executed this time based on the latest results obtained in the process I.

Figure 4:
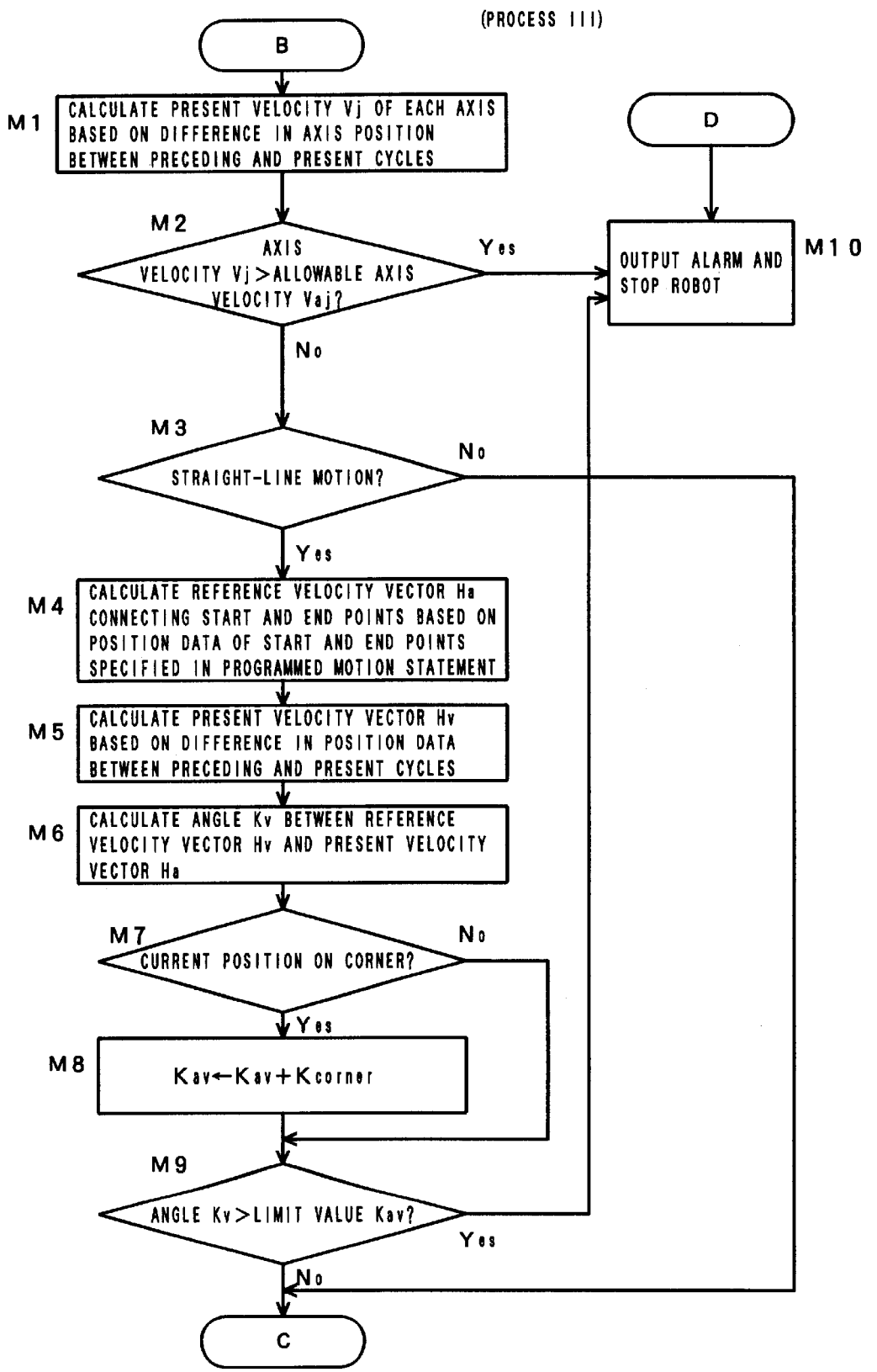
FIG. 4 is a flowchart showing an outline of a process III to be executed within the robot controller according to the embodiment of the present invention.
Figure 7:
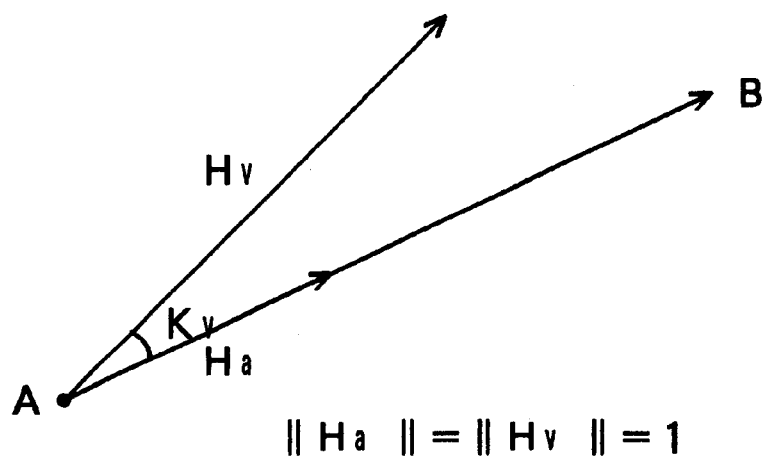
FIG. 7 is a diagram relating to the process III.

Process III (FIGS. 4 & 7)

This process is a processing cycle which is started from a state B in the process II. However, Step M10 for stopping the robot can be started from the route labeled D.

(M1): Based on the difference between the position data of each axis read out from the shared RAM 32 in the preceding cycle and that read out from the shared RAM 32 in the current cycle, a current velocity Vj of each axis is calculated.

(M2): With respect to each of the axes, the current velocity Vj is compared with the allowable axis velocity (limit value) Vaj set in the process I. If the former is greater than the latter, the flow proceeds to Step M10 to stop the robot; if not, the flow proceeds to Step M3.

(M3): If the specified motion type is straight-line motion, the flow proceeds to Step M4; if not, the flow proceeds to a processing cycle (described later) labeled C.

(M4): Based on position data of start and end points A and B specified in the programmed motion statement, a reference velocity vector Ha (standardized as a unit vector) from the start point to the end point, as shown in FIG. 7, is calculated.

(M5): Based on the difference between the end effector position calculated from the position data of the respective axes read out from the shared RAM 32 in the preceding cycle and that calculated from the position data of the respective axes read out from the shared RAM 32 in the current cycle, a current velocity vector Hv (standardized as a unit vector), as shown in FIG. 7, is calculated.

(M6): Based on the outer product of the vectors Ha and Hv, an angle Kv between the vectors Ha and Hv is calculated, as shown in FIG. 7.

(M7): It is determined whether or not the robot is currently passing a corner (in the vicinity of a corner). For example, if the distance from the position at which the current position was determined to be on a corner in Step S13 in the process I is smaller than or equal to a predetermined small value, it is determined that the robot is currently passing a corner. If the robot is determined to be passing a corner, the flow proceeds to Step M8; if not, the flow proceeds to Step M9.

(M8): The limit angle Kav is updated by adding thereto Kcorner set in the process I.

(M9): The current value Kv is compared with the limit angle Kav. If the former is greater than the latter, the flow proceeds to Step M10 to stop the robot; if not, the flow proceeds to the process labeled C.

(M10): This process is executed when an abnormal motion of the robot is detected, in which an alarm signal is output, the mechanical brake is set operative, and the servo power supply is cut off.

Figure 5:
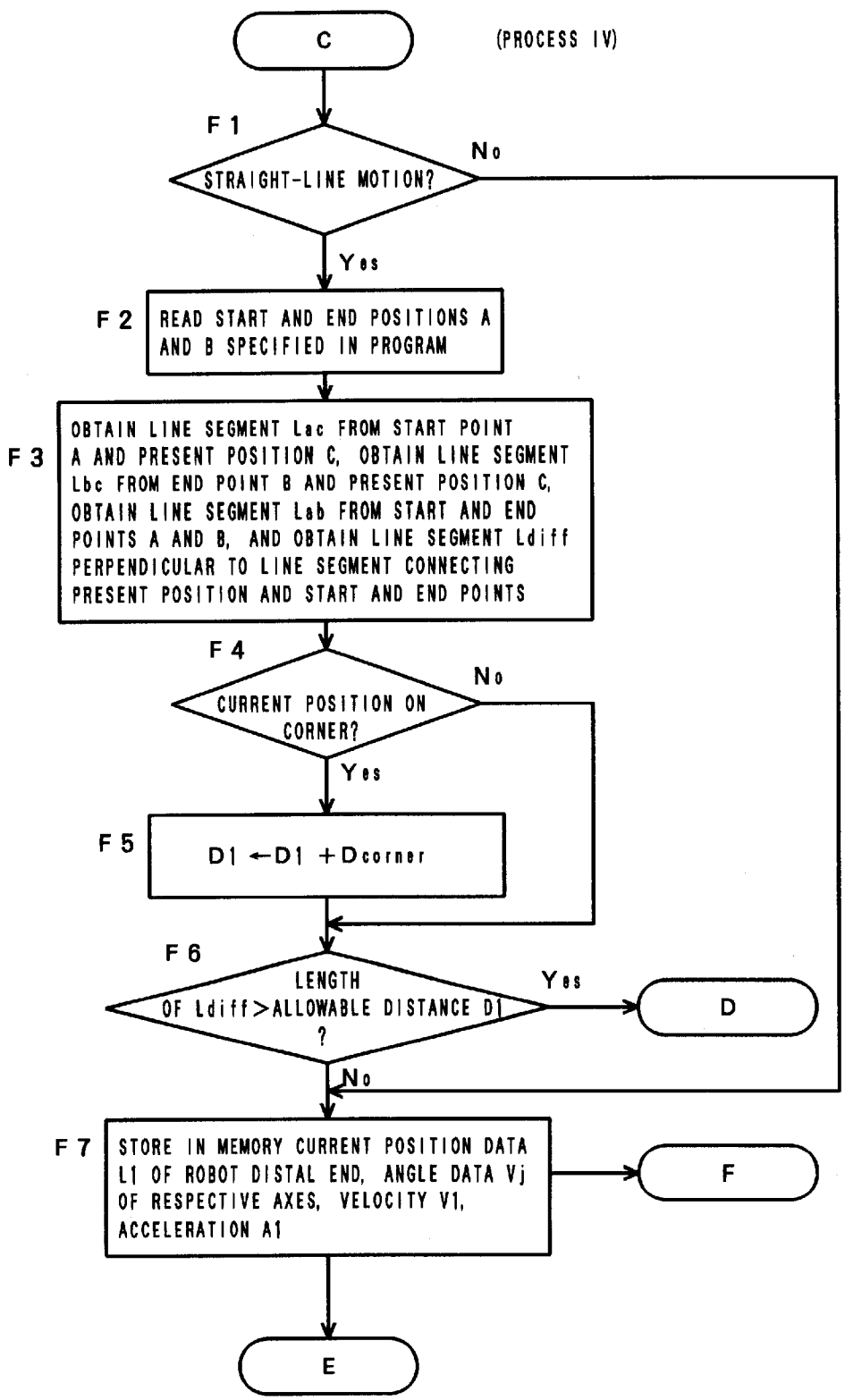
FIG. 5 is a flowchart showing an outline of a process IV to be executed within the robot controller according to the embodiment of the present invention.
Figure 8:
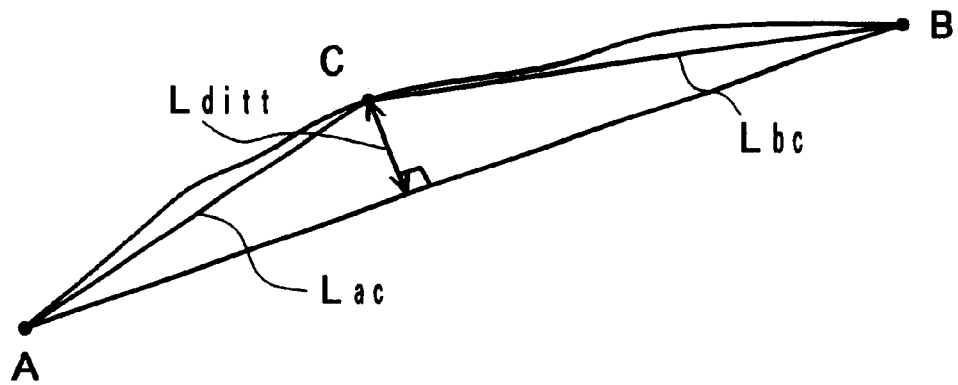
FIG. 8 is a diagram relating to the process IV.

Process IV (FIGS. 5 & 8)

This process is a processing cycle starts from a state C in the process III (F1): If the type of motion is straight-line motion, the flow proceeds to Step F2, and if not (i.e., circular-arc motion), the flow proceeds to Step F7.

(F2): Position data of the start and end points A and B specified in the programmed motion statement are read.

(F3): As shown in FIG. 8, a line segment Lac is obtained from the start point A and, the current position C; a line segment Lbc is obtained from the end point B and the current position C, and based on the line segments thus obtained, a line segment Lditt perpendicular to the line segment AB is obtained.

(F4): It is determined whether or not the robot is currently passing a corner (in the vicinity of a corner), in a manner similar to Step M7 in the process III. If the robot is currently passing a corner (in the vicinity of a corner), the flow proceeds to Step F5; if not, the flow proceeds to Step F6.

(F5): The limit distance D1 is updated by adding thereto Dcorner set in the process I.

(F6): The current length of Lditt is compared with the limit distance D1. If the former is longer than the latter, the flow proceeds to Step M10 to stop the robot; if not, the flow proceeds to Step F7.

(F7): The current position data LI of the distal end of the robot (obtained in Step T8 in the process II), the angle data Vj of the respective axes, the current velocity VI, and the current acceleration A1 are stored in memory (labeled F), and the flow proceeds to stage labeled E. As mentioned above, from the stage labeled E, the flow proceeds to Step T6 in the process II.

The foregoing describes the processes executed within the robot controller during a program playback operation. In the event any of the aforementioned various types of abnormal motions occurs, such abnormality is immediately detected by the processes described above and the robot comes to a stop, so that safety is secured.

In the case of manual feed operation, a process V illustrated in the flowchart of FIG. 6 may be executed as a process equivalent to the process I. It should be noted that, in general, manual feed operation involves no circular-arc motion (The result of determination according to a straight line or respective axes is output in motion type determination step).

Process V (FIG. 6)

This process is one for internally creating abnormal motion detection criteria for manual operation in accordance with manual feed conditions (related set conditions including manual operation mode, such as straight-line feed or respective axes feed and manual feed velocity specified by means of the teaching panel, and override for the manual feed velocity, etc.), and the contents of the individual steps thereof are explained below.

(G1): Manual feed conditions are read out.

(G2): If the motion type condition specified is the respective axes motion, the flow proceeds to Step G3; if not, the flow proceeds to Step G4.

(G3): Based on related set conditions such as a specified manual feed velocity and an override value to the manual feed velocity, an allowable velocity Vaj for each axis (jth axis) is calculated and set. The allowable velocity Vaj may be set in common for some or all of the axes. Provided the set manual feed velocity is Vmn and the override value is $\beta$, for example, the allowable velocity Vaj is obtained by multiplying Vfj by a coefficient k3, greater than "1" (e.g., "1.2"), Vfj being a maximum value of axis velocity calculated based on $\beta$ Vmn.

(G4): Based on the related set conditions such as a specified manual feed velocity and an override value to the manual feed velocity, an allowable velocity Val for the end effector is calculated and set. For example, provided the set manual feed velocity is Vmq and the override value is y, the allowable velocity Val is obtained by multiplying a velocity value, which is calculated based on γ Vmq, by a coefficient k4, greater than "1" (e.g., "1.2").

(G5): An allowable acceleration Aal for the end effector is read out from preset parameters and is set.

(G6): An allowable velocity Vaj for each axis jth axis) is calculated and set, in a manner similar to Step S10 in the process I.

(G7): A velocity vector error angle limit value Kav for the end effector (value set for manual feed operation) is read out from preset parameters and is set.

(G8): An allowable distance limit value D1 for the end effector (value set for manual feed operation) is read out from preset parameters and is set.

According to the process V described above, criteria for detecting various abnormal motions of the robot are set in accordance with current manual feed conditions. The state in which such settings have been completed is regarded as the aforementioned state A and the processes II to IV are then executed, whereby, in the event any of the aforementioned various types of abnormal motions takes place during manual operation, such abnormality is immediately detected and the robot comes to a stop, thus ensuring safety.

According to the present invention, when the point representative of the position of a robot, which is making motions in program playback operation mode or manual operation mode, shows an abnormal velocity, an abnormal acceleration, an abnormal change of orientation, or an abnormal movement path in space, such abnormality can be quickly and automatically sensed, and the robot is stopped to thereby avoid danger.

What is claimed is:

1. A robot controller for controlling motion of an end effector mounted on a robot having a plurality of robot axes in accordance with a motion program, each of said robot axes being provided with a position detector, said robot controller comprising:
   a motion-type determining unit to determine whether a type of motion specified by the motion program is a path-control motion requiring a path control of the end effector or a respective-axes motion not requiring the path control of the end effector;

a discrimination reference setting unit to set values of discrimination references for the type of motion determined by said motion-type determining unit based on data in the motion program;

a discrimination parameter setting unit to set discrimination parameters for discriminating an abnormal motion of the end effector on the robot, for the type of motion determined by said motion-type determining unit, based on present position data of the robot axes obtained from outputs of the position detectors while said robot is in motion;

a discriminating unit to compare said discrimination parameters with the values of the corresponding discrimination references, respectively and discriminate an abnormal motion of the end effector when one of said abnormal motion discrimination parameters exceeds the value of the corresponding discrimination reference; and a stopping unit for immediately stopping motion of said robot when the abnormal motion of the end effector is discriminated by said discriminating unit.

2. The robot controller according to claim 1, wherein said discrimination parameter includes a parameter indicative of a moving velocity of the end effector, and the discrimination reference value includes a value for discriminating abnormality of moving velocity of the end effector.

3. The robot controller according to claim 1, wherein said determination parameter includes a parameter indicative of an acceleration of said end effector, and said discrimination reference value includes a value for discriminating abnormality of acceleration of said end effector.

4. The robot controller according to claim 1, wherein said discrimination parameter includes a parameter representing angular velocity of a wrist axis of said robot, and said discrimination reference value includes a value for discriminating abnormality of angular velocity of the wrist axis of said robot.

5. The robot controller according to claim 1, wherein said discrimination parameter includes a parameter representing direction of movement of said end effector during a path control of said robot, and the discrimination reference value includes a value for discriminating abnormality in direction of movement of said end effector.

6. The robot controller according to claim 1, wherein said discrimination parameter includes a parameter representing a position of said end effector during a path control of said robot, and said discrimination reference value includes a value for discriminating abnormality of the position of said end effector.

7. The robot controller according to claim 1, further comprising means for automatically setting said discrimination reference value based on data in a taught motion program.

8. The robot controller according to claim 1, further comprising means for automatically setting said discrimination reference value based on data in a taught motion program and an override condition.

9. The robot controller according to claim 1, further comprising means for automatically setting said discrimination reference value based on a preset manual operation condition.

10. The robot controller according to claim 1, wherein said path-control motion includes a straight-line motion requiring a straight-line path of the end effector, and a circular-arc motion requiring a circular-arc path of the end effector.

* * * * *

UNITED STATES PATENT AND TRADEMARK OFFICE
CERTIFICATE OF CORRECTION

PATENT NO. : 6,208,105 B1
DATED : March 27, 2001
INVENTOR(S) : Kato et al.

Page 1 of 1

It is certified that error appears in the above-identified patent and that said Letters Patent is hereby corrected as shown below:

Title page,
Item [75], change "Oshino-mura" to -- Minamitsuru --.

Column 2,
Line 30, "(Abnormality 1)" begins new paragraph.
Line 32, "(Abnormality 2)" begins new paragraph.
Line 35, "(Abnormality 3)" begins new paragraph.
Line 39, "(Abnormality 4)" begins new paragraph.
Line 43, "(Abnormality 5)" begins new paragraph.

Column 4,
Line 30, insert -- (-- after "axis".
Line 47, "(56)" begins new paragraph.
Line 50, insert -- (-- after "axis".

Column 5,
Line 1, insert -- (-- after "axis".
Line 4, change "S 7" to -- S7 --.

Column 8,
Line 26, change "y" to -- Y --.
Line 32, insert -- (-- after "axis".

Column 9,
Line 16, insert -- , -- after "respectively".

Signed and Sealed this

Twenty-second Day of January, 2002

Attest:

*Attesting Officer*

JAMES E. ROGAN
*Director of the United States Patent and Trademark Office*